United States Patent [19]

Horikiri et al.

[11] 4,096,769

[45] Jun. 27, 1978

[54] PLANETARY GEAR TYPE TRANSMISSION

[75] Inventors: Kazuhito Horikiri; Hiroshi Hirasawa; Minoru Fujiwara, all of Okayama, Japan

[73] Assignee: Kabushiki Kaisha Toyota Chuo Kenkyusho, Japan

[21] Appl. No.: 679,482

[22] Filed: Apr. 22, 1976

Related U.S. Application Data

[63] Continuation-in-part of Ser. No. 594,942, Jul. 11, 1975, abandoned.

[51] Int. Cl.² ............................................. F16H 1/48
[52] U.S. Cl. ........................................ 74/801; 74/410
[58] Field of Search ............ 64/12, 15 R, 15 B, 27 B; 74/410, 411, 788, 792, 801; 192/70.18

[56] References Cited

U.S. PATENT DOCUMENTS

| 1,765,209 | 6/1930 | Dalton et al. | 64/15 B |
|---|---|---|---|
| 2,431,409 | 11/1947 | Mart | 64/12 |
| 2,936,655 | 5/1960 | Peterson et al. | 74/410 |
| 3,289,488 | 12/1966 | Breuer | 64/15 R |
| 3,336,764 | 8/1967 | Chambers | 64/15 R |
| 3,401,580 | 9/1968 | Sigg | 74/801 |
| 3,434,374 | 3/1969 | Barwig et al. | 74/410 |
| 3,884,098 | 5/1975 | Gumpoltsberger | 74/801 |

FOREIGN PATENT DOCUMENTS 1,000,914  8/1965  United Kingdom ................ 64/15 R Primary Examiner—Stephen C. Bentley
Attorney, Agent, or Firm—Koda and Androlia

[57] ABSTRACT

A planetary gear type transmission designed to equalize the load on a plurality of planet gears meshed with a sun gear. The planetary gear type transmission includes an intermediate ring or annulus which is disposed between an outer ring gear in mesh with the planet gears and a low speed shaft or casing connected to the ring gear. Furthermore, the annulus is coupled to the ring gear and the low speed shaft or casing by means of flexible couplings, each of which comprises a plurality of flat springs.

6 Claims, 11 Drawing Figures

PLANETARY GEAR TYPE TRANSMISSION

BACKGROUND OF THE INVENTION

This is a continuation-in-part application of U.S. Ser. No. 594,942 filed July 11, 1975, now abandoned.

FIELD OF INVENTION

This invention relates to planetary type transmissions and more specifically to planetary type transmissions provided with flexible coupling means between the internal or ring gear and a member connected to same.

PRIOR ART

Transmissions of the planetary gear type using a plurality of planet gears have a common disadvantage in that the gears are not evenly in mesh with the sun gear and the ring gear. Therefore, the load is not uniformly borne by the individual planet gears. This defect is ascribable to the errors in machining or assembling of the various gears, shafts, bearings or other elements of the transmission, to deflections of the shafts under an eccentric load, or to the strain or displacement of the components due to distortions of the vehicles, i.e. hulls of ships, on which such transmissions are mounted.

In order to insure even engagement of all planet gears with the ring gear and sun gear for uniform distribution of the load among the planets it is only necessary to equalize the tightness with which the individual planet gears are in mesh. The tightness can be equalized by loosing any planet gears which are more tightly engaged with the sun gear and ring gear then the rest while tightening any loosely engaged ones. This end is attained by adopting means to couple the ring gear to the low speed shaft casing slightly movable in the radial and axial directions relative to the later or with some flexibility. Such means include gear couplings and sprocket chain couplings which are known in the art. However, these conventional couplings occupy a rather large space around the ring gear thereby limiting the size of the ring gear in the space to be taken up by the transmission as a whole. In other words, if a large capacity transmission of a planetary type is to be built, a conventional coupling will make it necessary for the transmission to have an unduly large volume. Accordingly, the ratio of the effective space of the transmission to the overall space occupied is undesirably low.

SUMMARY OF THE INVENTION

It is a general object of the present invention to provide a planetary gear type transmission wherein a flexible coupling for the ring gear and the low speed shaft or casing can be provided in a limited space around the ring gear.

It is another object of the present invention to provide a planetary gear type transmission capable of absorbing undue external forces that may be exerted on the gears and bearings.

It is still another object of the present invention to provide a planetary gear type transmission having flexible couplings with generally oval shaped flat elements, connected one after another in plural rows like links of chain.

It is yet another object of the present invention to provide a planetary gear type transmission having flexible couplings being made from a material which is readily available commercially and easy to machine and fabricate.

In keeping with the principals of the present invention, the objects are accomplished with the unique combination comprising a sun gear formed integrally with a high speed shaft, a plurality of planet gears rotatably mounted on spindles supported by carrier arms around the sun gear and meshed with the sun gear, a ring gear meshed with the planet gears, an intermediate ring or annulus located coaxially with and adjacent to the ring gear, said annulus being formed with one flange facing the periphery of the ring gear and another flange facing a member to be connected to the ring gear, endless chain like coupling means disposed between the ring gear and one flange of the annulus, and endless chain like means disposed between the other flange of the annulus and the member connected to the ring gear. Both of the endless chain like coupling means are composed of a plurality of lengthwise overlapped flat resilient link assemblies having adjacent ends tightly connected to the other by pins and each resilient link assembly consisting of a plurality of flat parallel resilient elements arranged so that each assembly of each connected pair of assemblies has alternate ones of its resilient elements overlapping alternate ones of the other assembly of the pair. The pins in the first endless chain like coupling means are alternately fastened to the ring gear and one flange of the annulus whereas the pins in the second endless chain like coupling means are alternately fastened to the other flange of the annulus and the member connected to the ring gear.

BRIEF DESCRIPTION OF THE DRAWINGS

The above mentioned and other features and objects of the present invention will become more apparent by reference to the following description taken in conjunction with the accompanying drawings, wherein like reference numerals denote like elements, and in which.

DETAILED DESCRIPTION OF THE INVENTION

Figure 1:
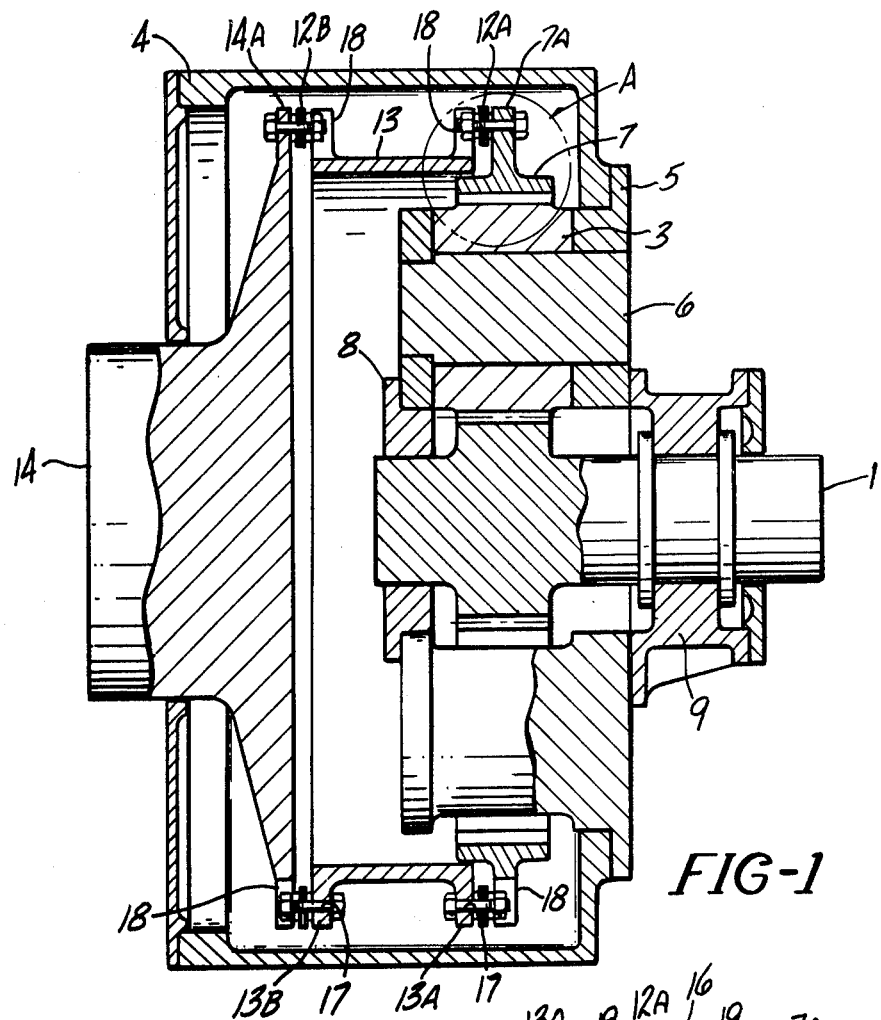
FIG. 1 is a side view shown partly in section of one embodiment of a planetary gear type transmission in accordance with the teachings of the present invention.
Figure 2:
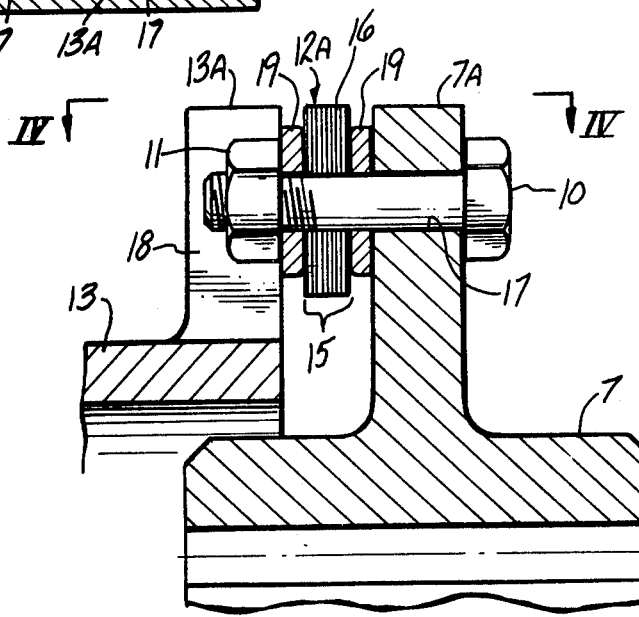
FIG. 2 is an enlarged fragmentary side view of a portion of A shown in FIGS. 1 and 11.

Referring to FIGS. 1 – 10, shown therein is a planetary gear type transmission in accordance with the teachings of the present invention. The planetary gear type transmission comprises a high speed shaft formed in one piece with a coaxial sun gear 2 which in turn meshes with a plurality of planet gears 3 arranged there around.

The planet gears 3 are rotatably supported by carrier arms 5 secured to a casing 4 through planet spindle 6 and meshed simultaneously with an outer ring gear 7 which is held coaxially with sun gear 2. High speed shaft 1 and sun gear 2 are rotatably supported by bearings 8 and 9.

Ring gear 7 has a flane 7A on its outer periphery. As better shown in FIG. 2, flange 7A is fastened by bolts 10 and nuts 11 via an endless chain like coupling means 12A to a flange 13A on one end of an intermediate ring or annulus 13.

Inside the annulus 13, which is coaxial with high speed shaft 1 are accommodated a sun gear 2, the planet gears 3, carrier arms 5, planet spindles 6, a part of ring gear 7, and bearing 8. On the other side of annulus 13 is formed another flange 13B opposite to the flange 13A.

The flange 13B is connected to a flange 14A on one end of low speed shaft 14 with bolts 10 all in the same radius and nuts 11 via endless chain like coupling means 12B. Both of the endless chain like coupling means 12A and 12B are composed of a plurality of lengthwise overlapping flat resilient link assemblies 15 having adjacent ends of which are interconnected together by bolts 10. Each assembly 15 consists of a plurality of flat parallel resilient elements 16 arranged so that each assembly of each connecting pair of assemblies has alternate ones of its resilient elements overlapping alternate ones of the other assembly of the pair.

Flanges 7A, 13A, 13B and 14A are formed with axial bolt holes 17 and depressions 18. Each of the depressions 18 is large enough to accommodate a nut 11. The bolts 10 each have an equal pitch corresponding with that of the holes 17. The bolt holes 17 and depressions 18 are positioned in pairs so that the holes 17 and depressions 18 of each flange coincide with depressions and through holes, respectively, of the mating flange.

Figure 3:
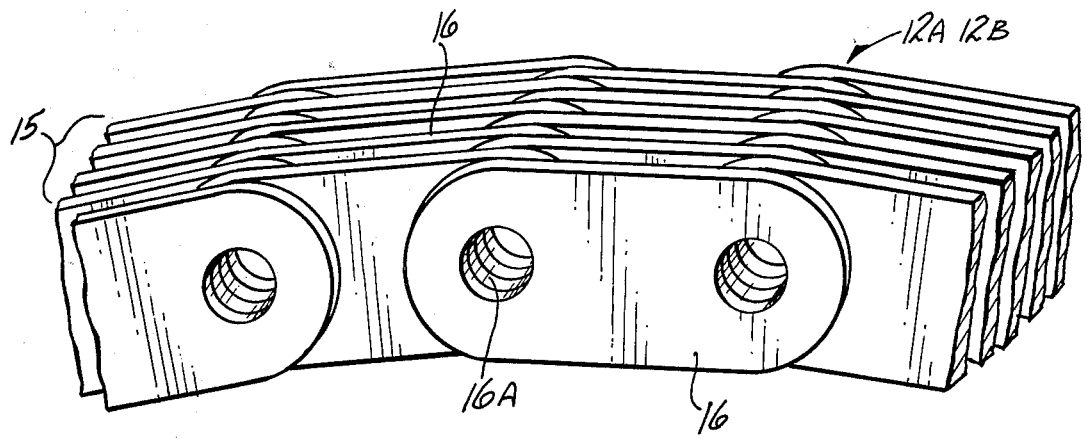
FIG. 3 is a prespective view of a flexible coupling for the transmission of FIG. 1.

As can be seen from FIG. 3 each flat element 16 is generally oval shaped and has two through holes 16A for receiving bolts with the same pitch as that of hole 17. Each pair of flanges are fastened together via the link assemblies 15 by bolts 10 inserted into the holes 17 and 16A and the depressions 18. In each case, nuts 11 are tightly threaded onto the ends of bolts 10. The washers 19 are interposed between the flanges and the flat elements 16. The bolts 10 are disposed alternately on opposite directions and each of the two circular endless chain like couplings is alternately bolted at regular intervals to the mating flanges. In this way the flanges in pairs 7A and 13A and 13B and 14A are connected to each other through a number of flat elements 16 sandwiched therebetween.

In the couplings 12A and 12B, any circumferentially adjoining two link assemblies (See FIGS. 5 and 6) are allowed to yieldably flex in the axial direction of the fastening bolts 10 (or axially of the annulus 13), as if for example "a single beam" with both ends fixed to be deformed under a concentric load applied at its middle point. In this instance, however, since every flat element 16 has been fastened firmly by bolts 10 and nuts 11, there is no freedom of angular displacement or deflection around bolts 10 due to the influence of friction. However, the above described flexing in the axial direction of fastening bolts 10 is possible due to longitudinal minor elongation of each flat element 16.

Figures 9, 10:
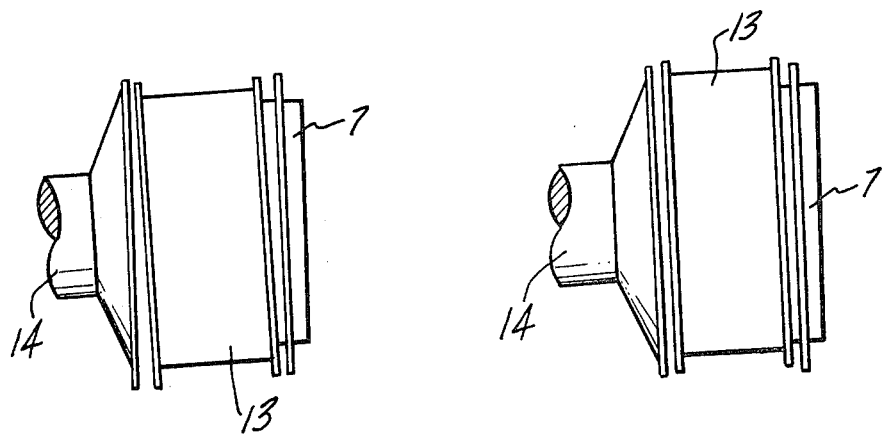
FIG. 9 is a schematic side view of the transmission of FIG. 1.
FIG. 10 is a schematic side view of the transmission of FIG. 1.
Figure 5:
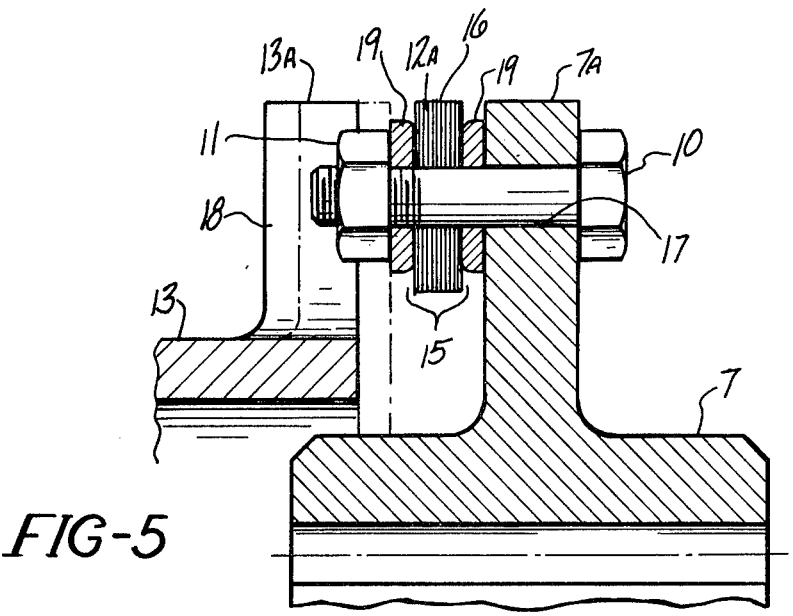
FIG. 5 is a partial side sectional view showing the action of the flexible coupling of the embodiment of FIG. 1.
Figure 6:
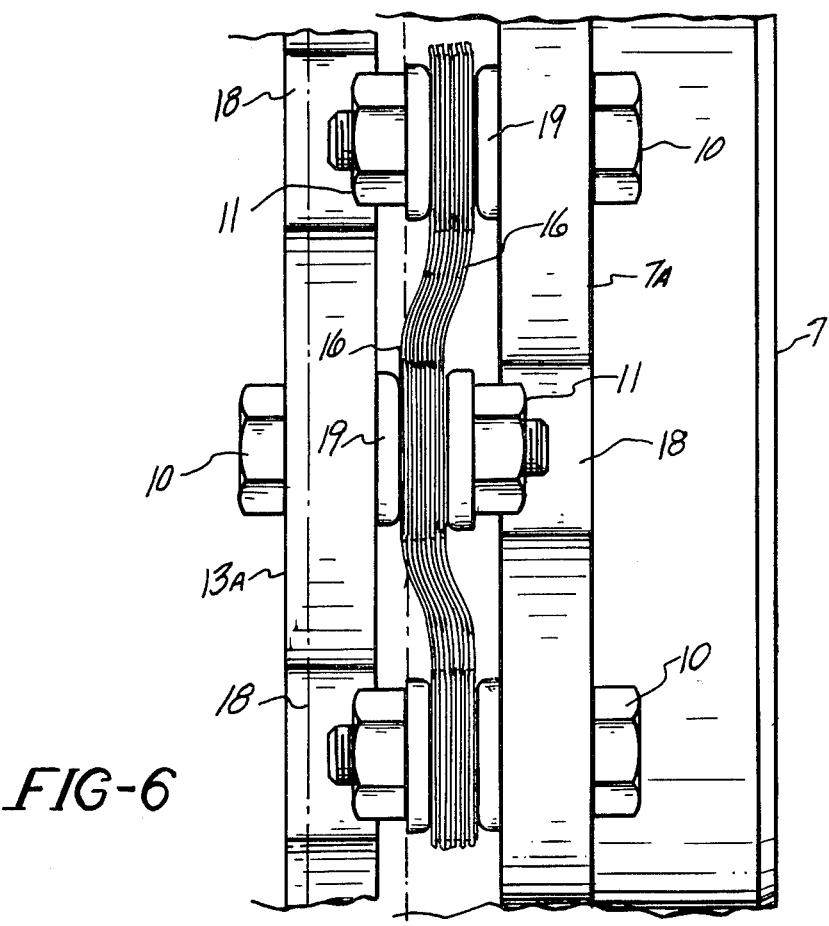
FIG. 6 is a partial plan view showing the action of the flexible coupling of the embodiment of FIG. 1.
Figure 7:
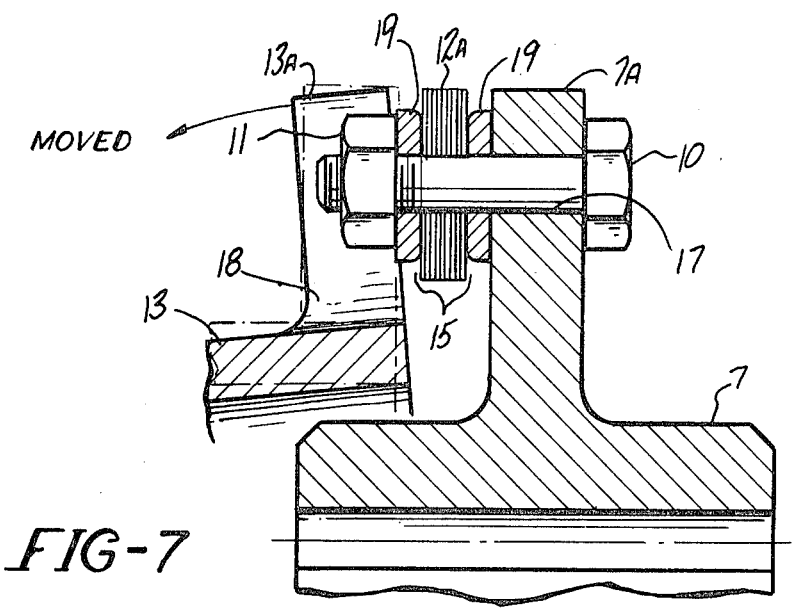
FIG. 7 is a partial side sectional view showing the action of the flexible coupling of the embodiment of FIG. 1.
Figure 8:
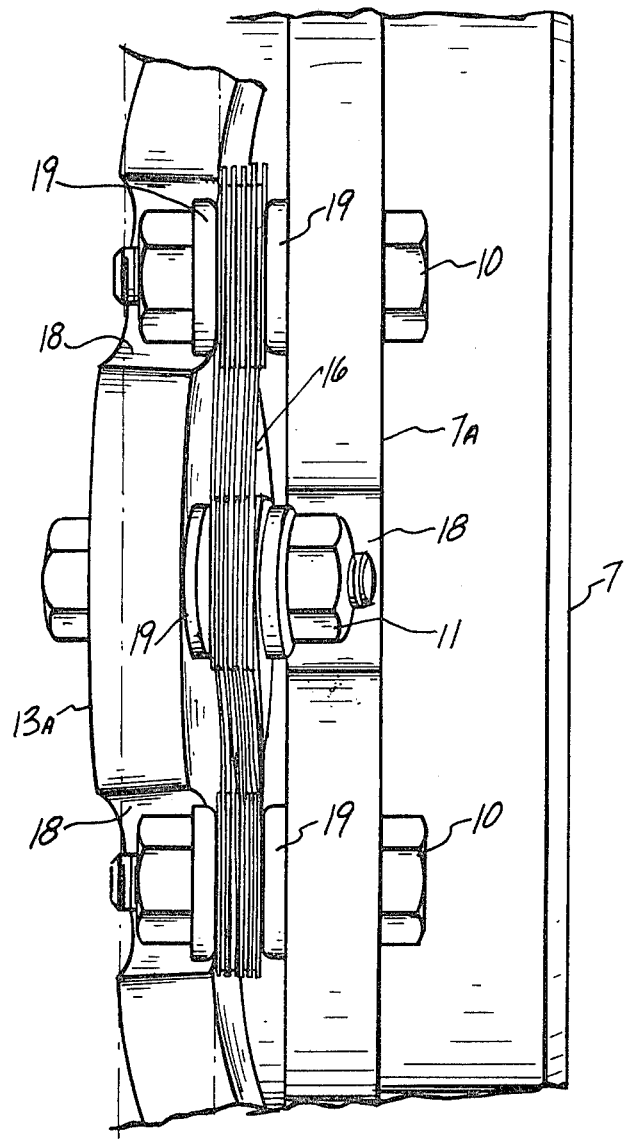
FIG. 8 is a partial plan view showing the action of the flexible coupling in the embodiment of FIG. 1.

When the axes of the annulus 13 and the internal gears 7 tend to show angular misalignment, as shown in FIGS. 7 and 8, there will occur in the flat elements 16 elastic deformation, "deflection" and "torsion" which permits such angular misalignment as shown in FIG. 9. Also when the ring gear 7 and the annulus 13 are loaded so as to cause parallel misalignment between them as shown in FIG. 10, each flat element 16 is deformed under the influence of bending, depression, torsion, deflection, and tension forces so that the two members as a whole are allowed to move relative to each other in the radial direction.

If the above deformation is viewed from the annulus 13, the annulus 13 and ring gear presents three possible movements, i.e., axial relative movement, angular misalignment, and radial relative movement. Yet, these movements are effected elastically and therefore very quick comeback or restoration takes place. Accordingly, this results in the meshing engagement between the ring gear 7 and the planetary gears 3 being uniform so that loads to be transmitted are uniformly shared among the planetary gears 3.

As apparent from the foregoing, the coupling means 12 elastically support the inner gear by the action of flexing and torsion of itself without causing such rotational movement between the link assemblies 15 around the bolts 10 as seen in the ordinary chain coupling thereby eliminating the necessity of lubricating the coupling itself.

Furthermore, each flat element 16 is made up of relatively small plate springs of identical shape which simplifies its manufacture and reduces the cost. As to the machining accuracy required in manufacturing, most of the possible errors can be provided for by forming relatively larger bolt receiving holes 16A in each of the flat elements 16.

Figure 11:
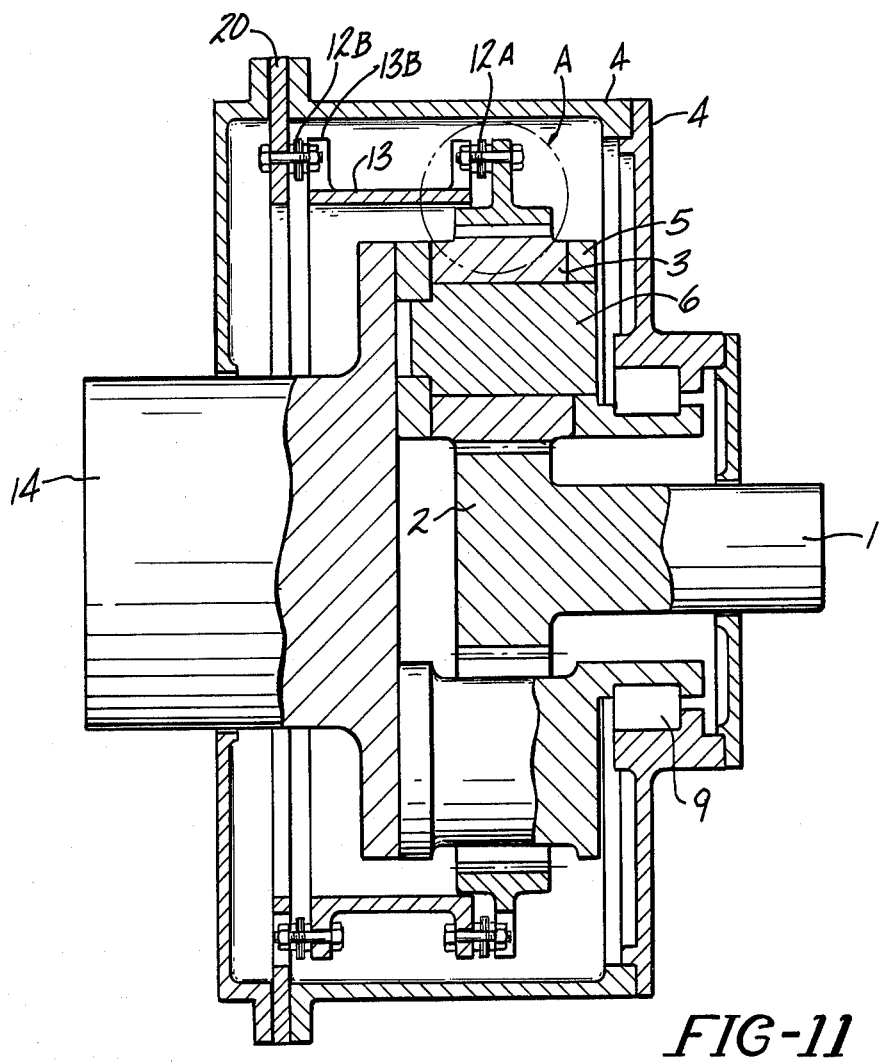
FIG. 11 is a side view shown partly in section of embodiment of a planetary gear type transmission in accordance with the teachings of the present invention.
Figure 4:
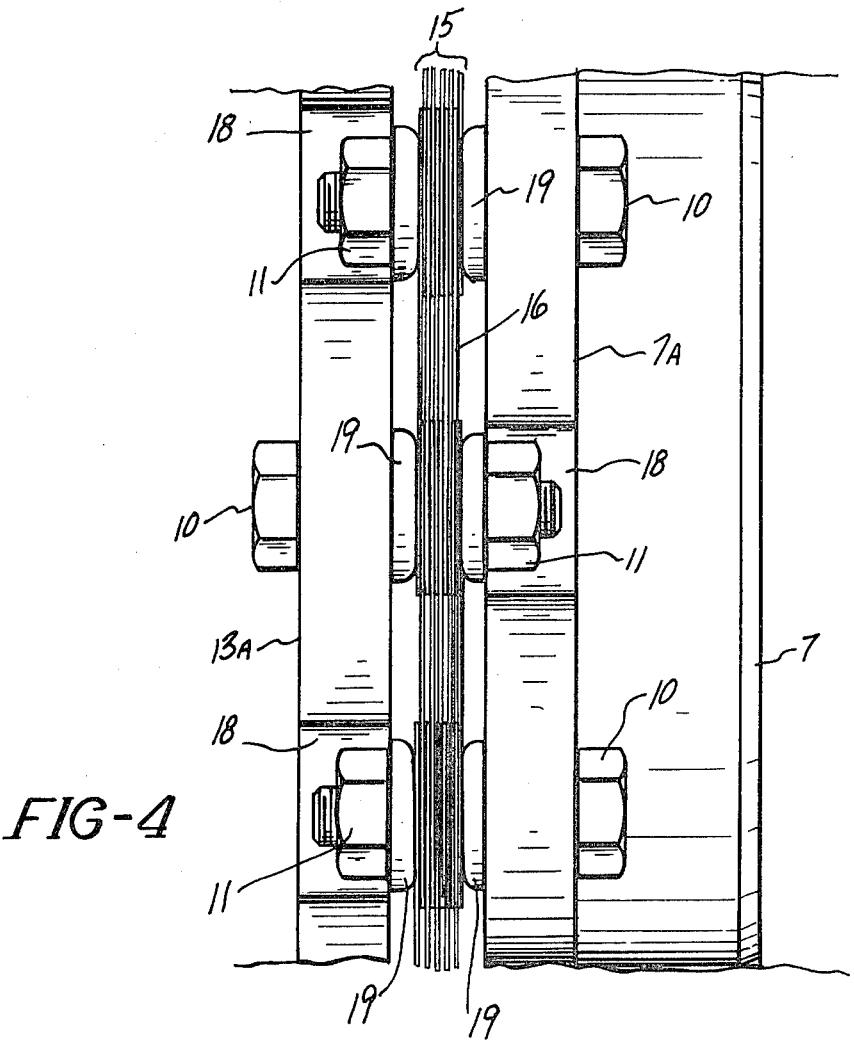
FIG. 4 is a partial plan view along the lines IV — IV in FIG. 2.

Referring to FIG. 11, shown therein is a second embodiment of a planetary gear type transmission in accordance with the teachings of the present invention. The planetary gear type transmission of FIG. 11 comprises a low speed shaft 14 connected to the planet carrier arms 5. The ring gear 7 is connected to annulus 13 through chain like coupling means 12A. The annulus 13 is coupled to a flange 20 provided in casing 4 through chain like coupling means 12B.

Similar to the first embodiment, the flat elements 16 again form endless chain like couplings 12A and 12B which are interposed between the flange 7A of ring gear 7 and flange 13A of annulus 13 and between the flange 13B of annulus 13 and flange 20 of casing 4. The respective flanges are attached together by bolts 10 and nuts 11. In the embodiment of FIG. 11 is very similar to that of the first embodiment shown in FIGS. 1 - 10, a detailed explanation of its operation is omitted.

In all cases it is understood that the above described embodiments are merely illustrative of but a small number of the many possible specific embodiments which represent the application of the principals of the present invention. Furthermore, numerous and varied other arrangements can be readily devised in accordance with the principals of the present invention by those skilled in the art without departing from the spirit and scope of the invention.

We claim:

1. A planetary gear type transmission comprising a sun gear formed integrally with a high-speed shaft, carrier arms secured to a casing, a plurality of planet gears which are rotatably supported on respective spindles provided on the carrier arms and which are meshed with the sun gear, a ring gear disposed in mesh with the planet gears, and a low-speed shaft in coaxial connection with the ring gear, wherein the improvement comprises:
- an intermediate ring or annulus disposed coaxially with and between the ring gear and the low-speed shaft, the annulus being formed with a first flange facing the periphery of the ring gear and a second flange facing the low-speed shaft;
- a first endless chain-like coupling means disposed between the ring gear and the first flange of the annulus; and
- a second endless chain-like coupling means disposed between the second flange of the annulus and the low-speed shaft, each of the endless chain-like coupling means being composed of a plurality of lengthwise overlapped flat resilient link assemblies, adjacent ends of which are fixed together, each assembly consisting of a plurality of flat parallel resilient elements arranged so that each assembly of each connected pair of assemblies has alternate ones of its resilient elements overlapping alternate ones of the other assembly of the pair, said adjacent ends of the first endless chain-like coupling means are alternately fastened to the ring gear and the first flange of the annulus, whereas the adjacent ends of the second endless chainlike coupling means are alternately fastened to said second flange of the annulus and the low-speed shaft.

2. A planetary gear type transmission according to claim 1, wherein the adjacent ends of said chain-like coupling means are fixed to the same peripheral points with the same pitch throughout.

3. A planetary gear type transmission according to claim 1, wherein the peripheral portion of the ring gear to which the adjacent ends of said first chain-like coupling means is fastened is flanged.

4. A planetary gear type transmission according to claim 2 wherein said adjacent ends of said coupling means are fixed to the peripheral points with bolts and nuts.

5. A planetary gear type transmission comprising a sun gear formed integrally with a high-speed shaft, a casing, carrier arms, a plurality of planet gears which are rotatably supported on respective spindles provided on the carrier arms and which are meshed with the sun gear, a ring gear disposed in mesh with the planet gears, and a low-speed shaft connected to the carrier arms, wherein the improvement comprises:
- an intermediate ring or annulus disposed coaxially with and between the ring gear and the casing, the annulus being formed with a first flange facing the periphery of the ring gear and a second flange facing the casing;
- a first endless chain-like coupling means disposed between the ring gear and the first flange of the annulus; and
- a second endless chain-like coupling means disposed between the second flange of the annulus and the casing, each of the endless chain-like coupling means being composed of a plurality of lengthwise overlapped flat resilient link assemblies, adjacent ends of which are fixed together, each assembly consisting of a plurality of flat parallel resilient elements arranged so that each assembly of each connected pair of assemblies has alternate ones of the other assembly of the pair, said adjacent ends of the first endless chain-like coupling means are alternately fastened to the ring gear and the first flange of the annulus, whereas said adjacent ends of the second endless chain-like coupling means are alternately fastened to the second flange of the annulus and the casing.

6. A planetary gear type transmission according to claim 5, wherein said adjacent ends of said chain-like coupling means are fastened on the same peripheral points with the same pitch throughout.

* * * * *

UNITED STATES PATENT OFFICE
CERTIFICATE OF CORRECTION

Patent No. 4,096,769  Dated June 27, 1978

Inventor(s) Kazuhito Horikiri et al.

It is certified that error appears in the above-identified patent and that said Letters Patent are hereby corrected as shown below:

On the title page, delete item "[73] Assignee....." in its entitety.

Signed and Sealed this,

Fourth Day of December 1979

[SEAL]

Attest:

Attesting Officer

SIDNEY A. DIAMOND

Commissioner of Patents and Trademarks